US010491496B2

(12) United States Patent
Gidugu et al.

(10) Patent No.: US 10,491,496 B2
(45) Date of Patent: Nov. 26, 2019

(54) DETERMINING THE HEALTH OF AN IOT APPLICATION

(71) Applicant: General Electric Company, Schenectady, NY (US)

(72) Inventors: Roopa Gidugu, San Ramon, CA (US); Soujanya Aluri, Bangalore (IN); Chris J. Wang, San Ramon, CA (US); Priyanka Vakeel, Bangalore (IN)

(73) Assignee: General Electric Company, Schenectady, NY (US)

( * ) Notice: Subject to any disclaimer, the term of this patent is extended or adjusted under 35 U.S.C. 154(b) by 180 days.

(21) Appl. No.: 15/389,615

(22) Filed: Dec. 23, 2016

(65) Prior Publication Data

US 2018/0183693 A1   Jun. 28, 2018

(51) Int. Cl.

| G06F 15/173 | (2006.01) |
|---|---|
| H04L 12/26 | (2006.01) |
| H04L 29/08 | (2006.01) |
| H04W 4/70 | (2018.01) |
| H04L 12/24 | (2006.01) |

(52) U.S. Cl.
CPC .......... *H04L 43/0817* (2013.01); *H04L 67/12* (2013.01); *H04L 67/26* (2013.01); *H04W 4/70* (2018.02); *H04L 41/0631* (2013.01); *H04L 43/16* (2013.01)

(58) Field of Classification Search
None
See application file for complete search history.

(56) References Cited

U.S. PATENT DOCUMENTS

| 2008/0168011 A1* | 7/2008 | Steinberg | G06K 9/6282 706/12 |
|---|---|---|---|
| 2011/0252394 A1* | 10/2011 | Sharma | G06F 11/3616 717/101 |
| 2015/0161008 A1* | 6/2015 | Antony | G06F 11/1448 714/16 |
| 2018/0052759 A1* | 2/2018 | Giral | G06F 11/3452 |
| 2018/0068220 A1* | 3/2018 | Shao | G06F 16/2465 |
| 2018/0081730 A1* | 3/2018 | Duttagupta | G06F 9/45558 |
| 2018/0081972 A1* | 3/2018 | Mohanbabu | H04L 63/0876 |

* cited by examiner

*Primary Examiner* — Umar Cheema
*Assistant Examiner* — Gregory P Tolchinsky
(74) *Attorney, Agent, or Firm* — Buckley, Maschoff & Talwalkar, LLC (57) ABSTRACT

The example embodiments are directed to a system and method for monitoring the health of analytical applications. In certain embodiments, these analytic applications may be a part of a broader IoT solution that may optionally be hosted on a cloud platform. In one example, the method includes receiving an output of an IoT analytic application deployed on a computing platform, selecting at least one performance metric based on a type of the application, calculating a performance of the application based on the selected performance metric, the received output of the application, and an expected output of the application, and in response to detecting the calculated performance of the application is below a predetermined threshold, outputting an alert to a user device. Accordingly, the health of an IoT analytic application can be monitored and an alert can be provided when the application operates below a predetermined threshold.

17 Claims, 8 Drawing Sheets

Regression Model Metrics

| Number of Intervals | R-Squared Value | Adj. R-Squared Value | MAE | MSE | RMSE |
|---|---|---|---|---|---|
| Last Week | 0.49 | 1.347 | 0.252 | 0.108 | 0.326 |
| Bi Weekly | 1.792 | 2.721 | 0.360 | 0.210 | 0.458 |
| Last Month | 2.153 | 3.121 | 0.413 | 0.238 | 0.488 |
| Last 2 Months | 1.318 | 2.302 | 0.361 | 0.192 | 0.438 |
| Last Quarter | 1.342 | 2.321 | 0.383 | 0.207 | 0.455 |

DETERMINING THE HEALTH OF AN IOT APPLICATION

BACKGROUND

Machine and equipment assets, generally, are engineered to perform particular tasks as part of a business process. For example, assets can include, among other things and without limitation, industrial manufacturing equipment on a production line, drilling equipment for use in mining operations, wind turbines that generate electricity on a wind farm, transportation vehicles, and the like. As another example, assets may include devices that aid in diagnosing patients such as imaging devices (e.g., X-ray or MRI systems), monitoring equipment, and the like. The design and implementation of these assets often takes into account both the physics of the task at hand, as well as the environment in which such assets are configured to operate.

Low-level software and hardware-based controllers have long been used to drive machine and equipment assets. However, the rise of inexpensive cloud computing, increasing sensor capabilities, and decreasing sensor costs, as well as the proliferation of mobile technologies have created opportunities for creating novel industrial and healthcare based assets with improved sensing technology and capable of transmitting data that can then be distributed throughout a network. As a consequence, there are new opportunities to enhance the business value of some assets through the use of novel industrial-focused hardware and software.

Businesses can create competitive advantages by harnessing the power of data and analytics to make better informed decisions. Analytical applications may accelerate the path to insights by integrating big data, advanced analytics, and compelling visualizations in tangible and intuitive software package. Industrial based and healthcare based analytical applications may be stored on the platform as part of a broader Internet of Things (IoT) solution. The analytical applications (also referred to herein as "analytics") may be created by different vendors using different programming languages. The analytics may have different inputs, different outputs, and behave differently from each other.

Analytics are typically designed to work with data from or about a particular asset or group of assets. For example, an analytical application may analyze data surrounding aircraft based assets, manufacturing based assets, healthcare based assets, energy based assets, transportation based assets, mining assets, and the like, using data from these assets. However, over time, unpredictable factors may cause the performance of an analytic to deteriorate. For example, changes in relationships between input variables of data sets, distributions in the values of the input variables, unexpected changes in the data sets, unexpected changes in a business process, unexpected changes in an asset configuration, and the like, could all affect the performance of an analytic.

SUMMARY

Embodiments of the invention disclosed herein provide for calculating the performance of IoT analytics that may optionally be part of a broader cloud-based IoT solution for the analysis, visualization and optimization of monitored machines and/or facilities. In an aspect of an example embodiment, there is provided a computing device including a storage configured to store an expected output of an Internet of Things (IoT) application deployed on a platform, e.g. a cloud platform, a processor configured to receive an output of the IoT application, select at least one performance metric, from among a plurality of performance metrics, based on a type of the IoT application, and calculate a performance of the IoT application based on the selected at least one performance metric, the received output of the IoT application, and the expected output of the IoT application, and an output unit configured to output an alert to a user device in response to the calculated performance of the IoT application being below a predetermined threshold.

In an aspect of another example embodiment, there is provided method for monitoring a health of an Internet of Things (IoT) application, the method including receiving an output of an IoT application deployed on a cloud platform, selecting at least one performance metric, from among a plurality of performance metrics, based on a type of the IoT application, calculating a performance of the IoT application based on the selected at least one performance metric, the received output of the IoT application, and an expected output of the IoT application, and in response to detecting the calculated performance of the IoT application is below a predetermined threshold, outputting an alert to a user device.

In an aspect of another example embodiment, there is provided a computer readable medium having stored therein instructions that when executed cause a computer to perform a method including receiving an output of an IoT application deployed on a cloud platform, selecting at least one performance metric, from among a plurality of performance metrics, based on a type of the IoT application, calculating a performance of the IoT application based on the selected at least one performance metric, the received output of the IoT application, and an expected output of the IoT application, and in response to detecting the calculated performance of the IoT application is below a predetermined threshold, outputting an alert to a user device.

Other features and aspects may be apparent from the following detailed description taken in conjunction with the drawings and the claims.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The example embodiments are directed to a health determination service for applications deployed on a cloud platform. For example, the service may monitor the health of an Internet of Things (IoT) analytical application that is deployed on the cloud platform and determine whether the health has reached a critical level or some other predetermined threshold. In particular, the service may detect when the health of the analytical application has deteriorated based on one or more performance metrics. As described herein, an analytical application (also referred to herein as analytic) may be associated with one or more assets in an IoT such as an Industrial Internet of Things (IIoT). Assets may include equipment and machines related to transportation, power stations, healthcare, turbines, mining operations, drilling operations, and the like.

The health determination service may be part of stewardship process included in the cloud platform and may improve the operational efficiency of an analytic deployed on the platform by sending notifications to a developer or other interested user when the health of the analytic drops below a minimum allowable tolerance level. Over time, the health of an analytic may change due to numerous and often unforeseen reasons which include factors such as changes to data input, changes to an asset, changes to an environment, and the like. When such a deterioration of the analytic performance is detected, the service may provide a notification to a user device such as a short message service (SMS), an email, and the like.

An analytic may be predictive and/or non-predictive and may be running as part of a larger analytic catalog or through an orchestration engine. The health determining service may not predict the behavior of the analytic but may monitor/detect accuracy and stability of the analytic via one or more performance and execution metrics. Some of the examples described herein include predefined performance metrics which may be selected by a user or which may be applied by default and that are used to determine the health of predictive analytics such as classification based analytics, regression based analytics, time-series based analytics, and the like. During execution, the health monitoring service may compare analytics of a same type and generate a visualization of a performance of the analytic over a period of time.

According to various embodiments, the health determining service may be hosted by a cloud platform computing environment, for example, an Internet of Things (IoT) or an Industrial Internet of Things (IIoT) based platform. While progress with machine and equipment automation has been made over the last several decades, and assets have become 'smarter,' the intelligence of any individual asset pales in comparison to intelligence that can be gained when multiple smart devices are connected together, for example, in the cloud. Assets, as mentioned above, may refer to equipment and machines used in fields such as energy, healthcare, transportation, heavy manufacturing, chemical production, printing and publishing, electronics, textiles, and the like. Aggregating data collected from or about multiple assets can enable users to improve business processes, for example by improving effectiveness of asset maintenance or improving operational performance if appropriate industrial-specific data collection and modeling technology is developed and applied.

An asset may be outfitted with one or more sensors configured to monitor respective operations or conditions. Data from the sensors can be recorded or transmitted to the cloud-based or other remote computing environment described herein. By bringing such data into a cloud-based computing environment, new software applications informed by industrial process, tools and know-how can be constructed, and new physics-based analytics specific to an industrial environment can be created. Insights gained through analysis of such data can lead to enhanced asset designs, enhanced software algorithms for operating the same or similar assets, better operating efficiency, and the like. Examples of the software applications are described herein as analytics. Analytics may be used to analyze, evaluate, and further understand issues related to manufacturing. However, due to many possible factors, the performance of an analytic may decline over time. One such reason for this is due to unforeseen changes to the data (i.e., unexpected events). However, it should be appreciated that analytics may decline for any number of reasons.

In an example, an IIoT connects assets including machines and equipment, such as turbines, jet engines, hospitals, locomotives, and the like, to the Internet or cloud, or to each other in some meaningful way such as through one or more networks. The systems and methods described herein can include using a "cloud" or remote or distributed computing resource or service. The cloud can be used to receive, relay, transmit, store, analyze, or otherwise process information for or about one or more assets. In an example, a cloud computing system includes at least one processor circuit, at least one database, and a plurality of users or assets that are in data communication with the cloud computing system. The cloud computing system can further include or can be coupled with one or more other processor circuits or modules configured to perform a specific task, such as to perform tasks related to asset maintenance, analytics, data storage, security, or some other function. The cloud may host and run various analytics having running instances that are accessible by authorized users of the analytic.

The Predix™ platform available from GE is a novel embodiment of an Asset Management Platform (AMP) technology enabled by state of the art cutting edge tools and cloud computing techniques that enable incorporation of a manufacturer's asset knowledge with a set of development tools and best practices that enables asset users to bridge gaps between software and operations to enhance capabilities, foster innovation, and ultimately provide economic value. Through the use of such a system, a manufacturer of assets can be uniquely situated to leverage its understanding of assets themselves, models of such assets, and industrial operations or applications of such assets, to create new value for industrial customers through asset insights. One of the primary tools creating a better understanding of these assets are analytics.

Figure 1:
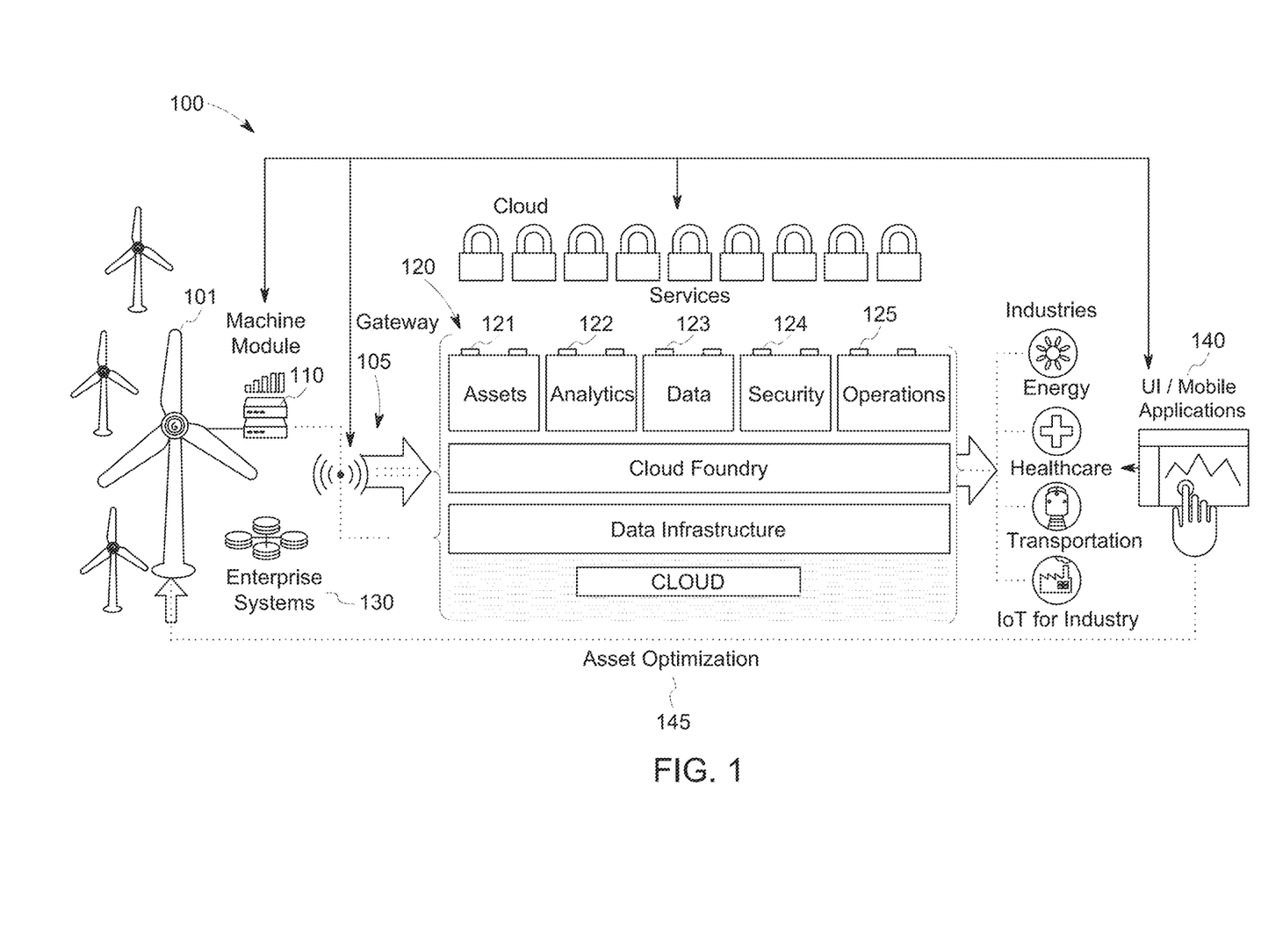
FIG. 1 is a diagram illustrating a cloud computing environment associated with industrial systems in accordance with an example embodiment.

FIG. 1 illustrates a cloud computing environment associated with industrial systems in accordance with an example embodiment. FIG. 1 illustrates generally an example of portions of an asset management platform (AMP) 100. As further described herein, one or more portions of an AMP can reside in a cloud computing system 120, in a local or sandboxed environment, or can be distributed across multiple locations or devices. The AMP 100 can be configured to perform any one or more of data acquisition, data analysis, or data exchange with local or remote assets, or with other task-specific processing devices. The AMP 100 includes an asset community (e.g., turbines, healthcare machines, industrial, manufacturing systems, etc.) which are communicatively coupled with the cloud computing system 120. In an example, a machine module 110 receives information from, or senses information about, at least one asset member of the asset community, and configures the received information for exchange with the cloud computing system 120. The machine module 110 may be coupled to the cloud computing system 120 or to an enterprise computing system 130 via a communication gateway 105.

The communication gateway 105 includes or uses a wired or wireless communication channel that extends at least from the machine module 110 to the cloud computing system 120. The cloud computing system 120 may include several layers, for example, a data infrastructure layer, a cloud foundry layer, and modules for providing various functions. In the example of FIG. 1, the cloud computing system 120 includes an asset module 121, an analytics module 122, a data acquisition module 123, a data security module 124, and an operations module 125. Each of the modules may include or use a dedicated circuit, or instructions for operating a general purpose processor circuit, to perform the respective functions. In an example, the modules 121-125 are communicatively coupled in the cloud computing system 120 such that information from one module can be shared with another. In an example, the modules 121-125 are co-located at a designated datacenter or other facility, or the modules 121-125 can be distributed across multiple different locations. According to various embodiments, the health monitoring service described herein may be stored on the cloud computing system 120 and may be used to monitor and detect health/performance concerns with analytical applications deployed on and hosted by the cloud computing system 120 (including any of the modules 121-125).

An interface device 140 (e.g., user device, workstation, tablet, laptop, appliance, kiosk, and the like) can be configured for data communication with one or more of the machine module 110, the gateway 105, and the cloud computing system 120. The interface device 140 can be used to monitor or control one or more assets. As another example, the interface device 140 may be used to develop and upload analytical applications to the cloud computing system 120. As yet another example, the interface device 140 may be used to access analytical applications hosted by the cloud computing system 120. Information about the asset community may be presented to an operator at the interface device 140. The information about the asset community may include information from the machine module 110, or the information can include information from the cloud computing system 120. The interface device 140 can include options for optimizing one or more members of the asset community based on analytics performed at the cloud computing system 120. Prior to analytics being accessed through the cloud computing system 120, the cloud computing system 120 may certify the analytics.

As a non-limiting example, a user of the interface device 140 may control an asset through the cloud computing system 120, for example, by selecting a parameter update for a first wind turbine 101. In this example, the parameter update may be pushed to the first wind turbine 101 via one or more of the cloud computing system 120, the gateway 105, and the machine module 110. In some examples, the interface device 140 is in data communication with the enterprise computing system 130 and the interface device 140 provides an operation with enterprise-wide data about the asset community in the context of other business or process data. For example, choices with respect to asset optimization can be presented to an operator in the context of available or forecasted raw material supplies or fuel costs. As another example, choices with respect to asset optimization can be presented to an operator in the context of a process flow to identify how efficiency gains or losses at one asset can impact other assets. The example of FIG. 1 includes the asset community with multiple wind turbine assets, including the first wind turbine 101. However, it should be understood that wind turbines are merely used in this example as a non-limiting example of a type of asset that can be a part of, or in data communication with, the first AMP 100.

FIG. 1 further includes the device gateway 105 configured to couple the asset community to the cloud computing system 120. The device gateway 105 can further couple the cloud computing system 120 to one or more other assets or asset communities, to the enterprise computing system 130, or to one or more other devices. The AMP 100 thus represents a scalable industrial solution that extends from a physical or virtual asset (e.g., the first wind turbine 101) to a remote cloud computing system 120. The cloud computing system 120 optionally includes a local, system, enterprise, or global computing infrastructure that can be optimized for industrial data workloads, secure data communication, and compliance with regulatory requirements.

The cloud computing system 120 can include the operations module 125. The operations module 125 can include services that developers can use to build or test Industrial Internet applications, and the operations module 125 can include services to implement Industrial Internet applications, such as in coordination with one or more other AMP modules. In an example, the operations module 125 includes a microservices marketplace where developers can publish their services and/or retrieve services from third parties. In addition, the operations module 125 can include a development framework for communicating with various available services or modules. The development framework can offer developers a consistent look and feel and a contextual user experience in web or mobile applications. Developers can add and make accessible their applications (services, data, analytics, etc.) via the cloud computing system 120. Prior to those applications being made available, the example embodiments may perform a certification process to verify the behavior, compatibility, and security of the applications.

Information from an asset, about the asset, or sensed by an asset itself may be communicated from the asset to the data acquisition module 123 in the cloud computing system 120. In an example, an external sensor can be used to sense information about a function of an asset, or to sense information about an environment condition at or near an asset. The external sensor can be configured for data communication with the device gateway 105 and the data acquisition module 123, and the cloud computing system 120 can be configured to use the sensor information in its analysis of one or more assets, such as using the analytics module 122. Using a result from the analytics module 122, an operational model can optionally be updated, such as for subsequent use in optimizing the first wind turbine 101 or one or more other assets, such as one or more assets in the same or different asset community. For example, information about the first wind turbine 101 can be analyzed at the cloud computing system 120 to inform selection of an operating parameter for a remotely located second wind turbine that belongs to a different asset community.

The cloud computing system 120 may include a Software-Defined Infrastructure (SDI) that serves as an abstraction layer above any specified hardware, such as to enable a data center to evolve over time with minimal disruption to overlying applications. The SDI enables a shared infrastructure with policy-based provisioning to facilitate dynamic automation, and enables SLA mappings to underlying infrastructure. This configuration can be useful when an application requires an underlying hardware configuration. The provisioning management and pooling of resources can be done at a granular level, thus allowing optimal resource allocation. In addition, the asset cloud computing system 120 may be based on Cloud Foundry (CF), an open source PaaS that supports multiple developer frameworks and an ecosystem of application services. Cloud Foundry can make it faster and easier for application developers to build, test, deploy, and scale applications. Developers thus gain access to the vibrant CF ecosystem and an ever-growing library of CF services. Additionally, because it is open source, CF can be customized for IIoT workloads.

The cloud computing system 120 can include a data services module that can facilitate application development. For example, the data services module can enable developers to bring data into the cloud computing system 120 and to make such data available for various applications, such as applications that execute at the cloud, at a machine module, or at an asset or other location. In an example, the data services module can be configured to cleanse, merge, or map data before ultimately storing it in an appropriate data store, for example, at the cloud computing system 120. A special emphasis may be placed on time series data, as it is the data format that most sensors use.

Security can be a concern for data services that exchange data between the cloud computing system 120 and one or more assets or other components. Some options for securing data transmissions include using Virtual Private Networks (VPN) or an SSL/TLS model. In an example, the AMP 100 can support two-way TLS, such as between a machine module and the security module 124. In an example, two-way TLS may not be supported, and the security module 124 can treat client devices as OAuth users. For example, the security module 124 can allow enrollment of an asset (or other device) as an OAuth client and transparently use OAuth access tokens to send data to protected endpoints.

Figure 2:
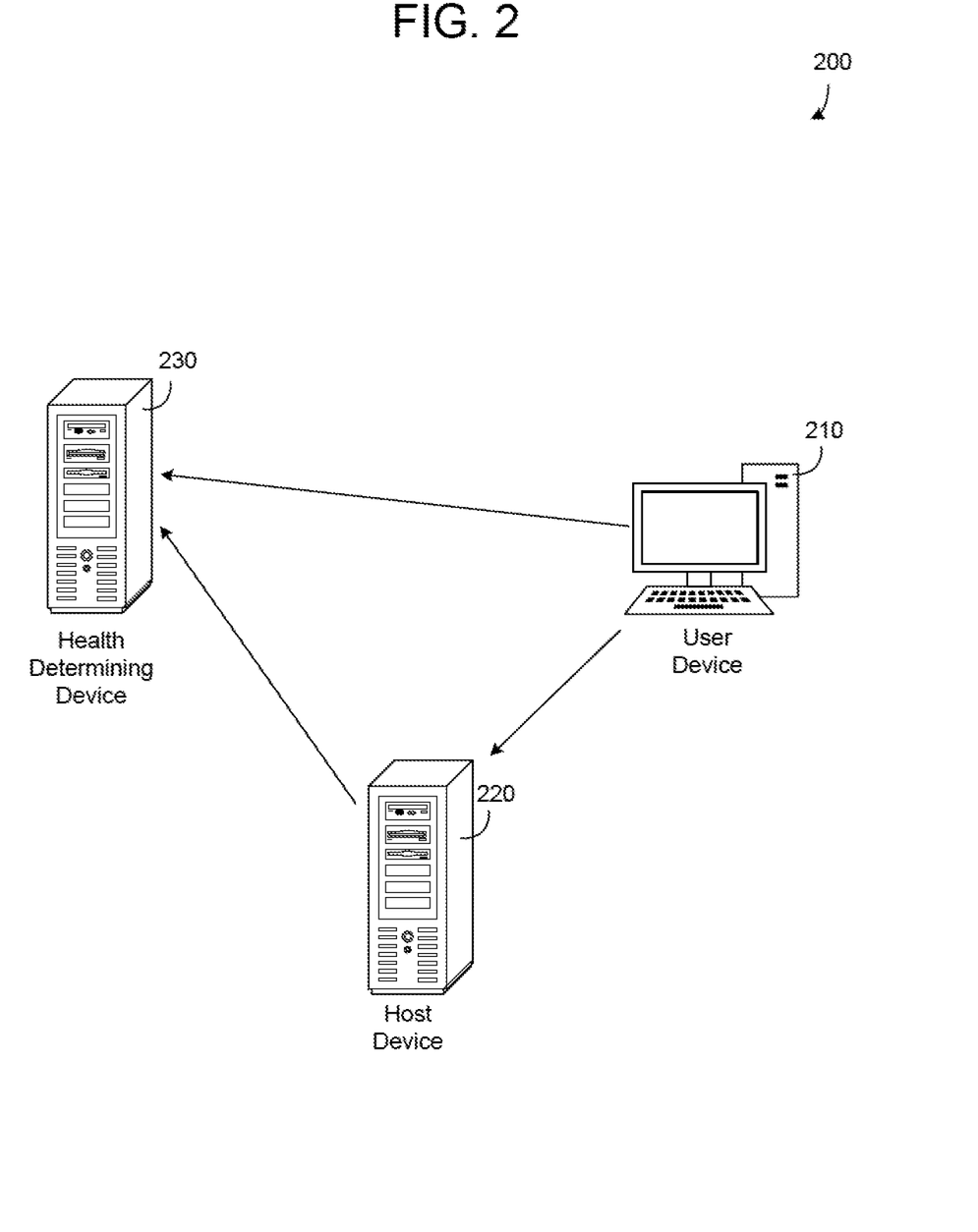
FIG. 2 is a diagram illustrating a system for determining the health of an IoT application in accordance with an example embodiment.

FIG. 2 illustrates a system 200 for determining the health of an IoT application in accordance with an example embodiment. Referring to FIG. 2, the system 200 includes a user device 210, a host device 220 (e.g., cloud platform device such as computing device 120 in FIG. 1), and a health determining device 230. Here, the host device 220 and the health determining device 230 may be instances included in the cloud platform but are illustrated here as individual devices for convenience of explanation. The user device 210, the host device 220, and the health determining device 230 may be connected to each other via one or more networks such as the Internet and/or private network. As another example, one or more of the devices may be coupled together or connected via a wired connection. The user device 210 may include, for example, a mobile phone, a tablet, a personal computer, a laptop, an appliance, a kiosk, a workstation, and the like. In this example, the host device 220 hosts a plurality of analytical applications while the health determining device 230 monitors and determines the performance of the plurality of analytical applications hosted by the host device 220. The health determining device 230 may provide an alert or some other notification to the user device 210 in response to the health determining device 230 determining that a performance of an analytical application is operating at or has fallen below a predetermined threshold value based on one or more calculated performance metrics.

The user device 210 may correspond to a developer of an analytical application or some other interested user who is interested in the health of the analytic. In this example, the user device 210 may upload the analytical application to the host device 220 to deploy the analytical application on the host device 220. In addition to providing the analytical application to the host device 220, the user device 210 may provide an expected output (i.e., a predicted behavior) of the analytical application to one or more of the host device 220 and the health determining device 230. Here, the expected output may represent an expected output of the analytical application when processing test data. For example, the output may include binary classifications (Yes/No), variables, statistics, descriptions, keywords, phrase, expected results, and the like. The host device 220 may host a running instance of the analytical application and generate an actual output of the analytical application based on various input data. The actual output of the analytical application may be provided to the health determining device 230, for example, each time the output is generated, periodically, randomly, and the like.

According to various embodiments, the health determining device 230 may perform one or more performance metrics on the analytical application to determine a performance of the analytical application. For example, the health determining device 230 may receive the expected output of the analytical application and the actual output of the analytical application, and process one or more performance metrics based on the expected output and the actual output to determine a performance value for the analytical application. For example, the performance value may detect an accuracy level, a stability reading, and the like, of the analytic which can provide insight into the health of the analytic. This health monitoring and detection process may be repeated each time the analytical application generates new output while being hosted by the host device 220. As another example, the health determining process may be repeated periodically or randomly.

Figure 5:
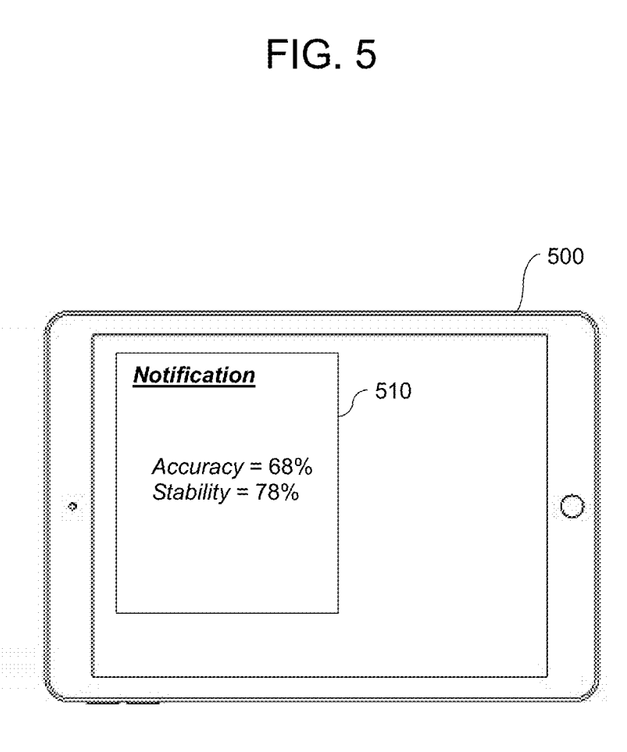
FIG. 5 is a diagram illustrating a user interface displaying an alert generated based on the performance of an IoT application in accordance with an example embodiment.

In response to a performance value for an analytic being determined as below a predetermined threshold value, the health detect determining device 230 may output an alert to the user device 210 thereby providing an indication of the deterioration of the performance of the analytic. An example of a notification is shown in the alert of FIG. 5. Referring to FIG. 5, a user device 500 is shown and may correspond to the user device 210 shown in FIG. 2. In this example, an alert message 510 is transmitted from a monitoring device such as health determining device 230 to the user device 500. The alert message 510 may include data and information about the analytic behavior such as a graph of the analytic output, performance metrics that have been calculated for the analytic based on expected and actual output, a notification of the levels or readings that are deteriorating, a description of the performance metrics, and the like. Accordingly, an interested party may be informed when an analytic has deteriorated and take corrective action to fix or otherwise modify the analytic to operate as it is expected.

Figure 3:
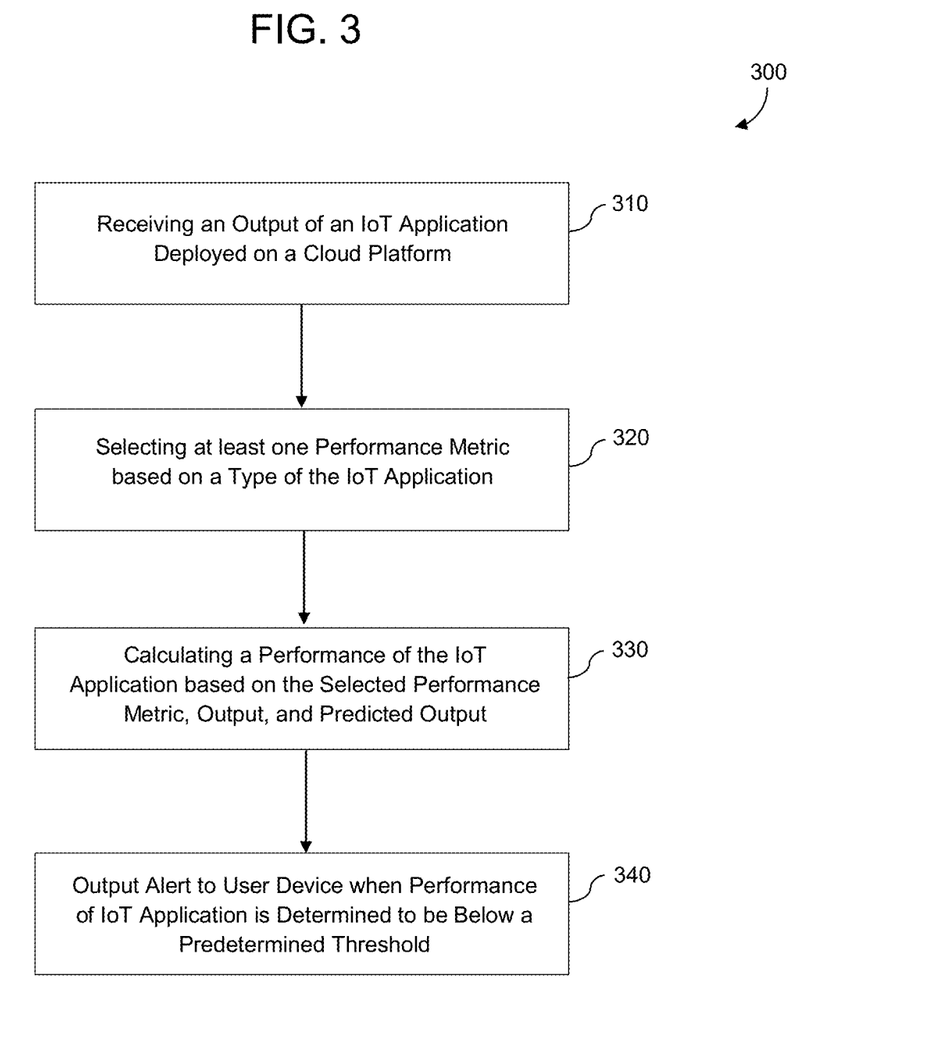
FIG. 3 is a diagram illustrating a method for determining the health of an IoT application in accordance with an example embodiment.

FIG. 3 illustrates a method 300 for determining the health of an IoT application in accordance with an example embodiment. For example, the method 300 may be performed by the health detecting device 230 shown in FIG. 2, or another device or combination of devices. In some examples, the method 300 is performed in a cloud computing environment. Referring to FIG. 3, in 310 the method includes receiving an output of an IoT application deployed on a cloud platform. For example, the method may capture an address (e.g., URL) of the IoT application (i.e., analytic) on the cloud platform, the database details of expected outputs of the analytic generated and provided from a user or developer of the analytic, and actual values output by the analytic in operation on the cloud platform. For example, the health monitoring and determining service that performs the method 300 may capture actual output from the analytic based on the URL. Accordingly, the health monitoring and determining service may receive the expected output and the actual output of the analytic in order to further analyze and monitor a health of the analytic.

In 320, the method includes selecting at least one performance metric, from among a plurality of performance metrics, based on a type of the IoT application. For example, the performance metric or a plurality of performance metrics may be selected by a user via a user interface displayed on a user device. The display may be generated by the health monitoring service running. Here, the method may include displaying a list of performance metrics that are capable of being selected by the user for a particular type of analytic. The performance may be calculated based on the predicted and actual outputs of the IoT application. According to various embodiments, different performance metrics may be provided for different types of analytic applications. In other words, the list of performance metrics that is displayed for use with an IoT application may be dynamically adjusted based on the type of the IoT application from among a plurality of possible types. The types of analytic applications may include classification based analytics, regression based analytics, time-series based analytics, and the like. For classification based analytics, the performance metrics available for selection may include a receiver operating characteristic (ROC) curve, a confusion matrix, and a lift chart. As another example, for regression based analytics, the performance metrics available for selection may include at least one of R squared, adjusted R squared, mean absolute error (MAE), mean squared error (MSE), mean square root error (RMSE), and the like. As another example, for time-series based analytics, the performance metrics available for selection may include at least one of MAE, MSE, plot of MAE against a plot of forecast time horizon, plot 95% confidence interval, and the like.

Based on the selected metrics, in 330, the method further includes calculating a performance of the IoT application based on the selected at least one performance metric, the received output of the IoT application, and the expected output of the IoT application. For example, the one or more performance metrics may be calculated by comparing the predicted output with the actual output of the IoT application based on one or more performance metrics to identify at least one of an accuracy value, a stability value, and the like, of the IoT application. Examples of performance metric results are displayed in FIGS. 6A-6C.

In response to detecting that the calculated performance of the IoT application is below a predetermined threshold, in 340 the method further includes outputting an alert to a user device. The alert may include an email, a text message (SMS), or some other notification that is delivered from the health monitoring service (e.g., on the cloud platform) to a user device. The alert may be triggered by the health monitoring and determining service and may be used to provide a notification to the developer or other interested user that the IoT application has deteriorated in performance. In some examples, the method further includes repeating the calculating in 330 and the alert generating in 340 for additional outputs of the IoT application. Here, the health monitoring and determining service may receive a new output of the IoT application deployed on the cloud platform, and calculate another performance of the IoT application based on the previously selected at least one performance metric, the newly received output of the IoT application, and the expected output of the IoT application. As another example, the performance metrics may be changed to provide an additional metric to be used to evaluate the performance of the analytic.

Figure 4:
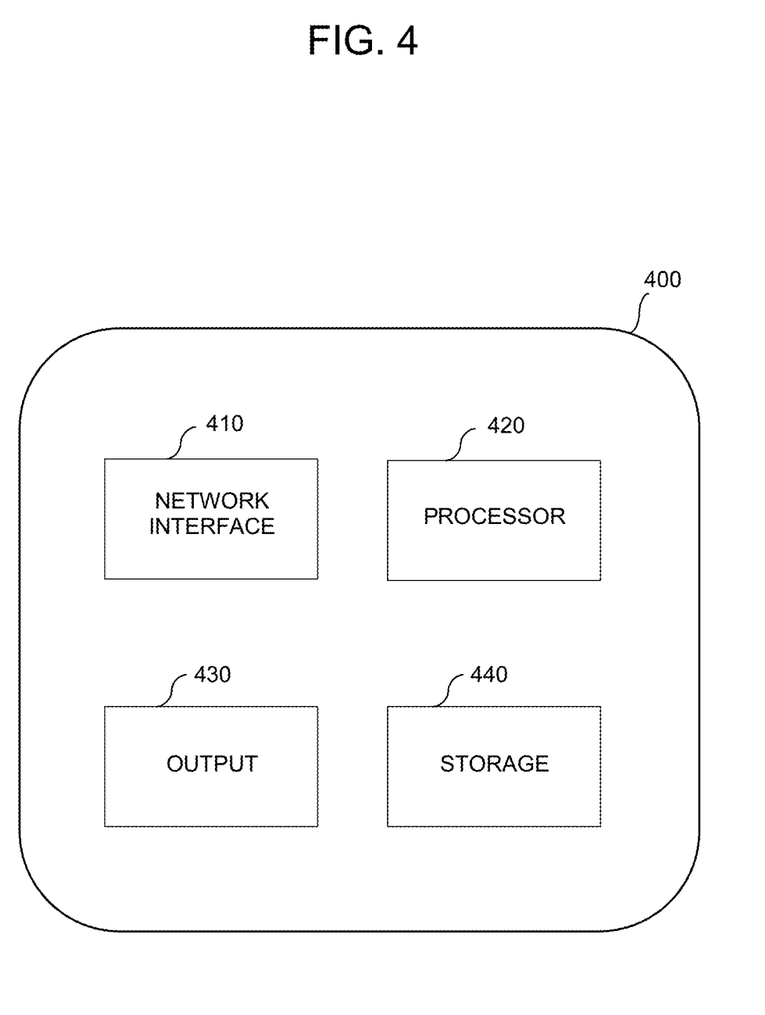
FIG. 4 is a diagram illustrating a device for determining the health of an IoT application in accordance with an example embodiment.

FIG. 4 illustrates a device 400 for determining the health of an IoT application in accordance with an example embodiment. For example, the device 400 may be the health detecting device 230 of FIG. 2, or another device. Also, the device 400 may perform the method of FIG. 4. Referring to FIG. 4, the device 400 includes a network interface 410, a processor 420, an output 430, and a storage 440. Although not shown in FIG. 4, the device 400 may include other components or may be externally connected to other components such as a display, an input unit, a receiver/transmitter, and the like. The network interface 410 may transmit and receive data over a network such as the Internet, a private network, a public network, and the like. The network interface 410 may be a wireless interface, a wired interface, or a combination thereof. The processor 420 may include one or more processing devices each including one or more processing cores. In some examples, the processor 420 is a multicore processor or a plurality of multicore processors. Also, the processor 420 may be fixed or it may be reconfigurable. The output 430 may output data to an embedded display of the device 400, an externally connected display, a cloud, another device, and the like. The storage 440 is not limited to any particular storage device and may include any known memory device such as RAM, ROM, hard disk, and the like.

According to various embodiments, the storage 440 may store an expected output of an IoT application deployed on a cloud platform. The expected output may be provided from a developer during an onboarding process of the IoT application to the cloud platform, or at some other point. The processor 420 may receive an output of the IoT application, select at least one performance metric, from among a plurality of performance metrics, based on a type of the IoT application, and calculate a performance of the IoT application based on the selected at least one performance metric, the received output of the IoT application, and the expected output of the IoT application. The calculated performance of the IoT application may include a calculated accuracy of the received output of the IoT application which is calculated based on a comparison of the received output and the expected output of the IoT application using at least one performance metric.

In response to the calculated performance being below a predetermined threshold, the processor 420 may control the output 430 to output an alert to a display such as a display connected to a user device. For example, the output 430 may display, via a user interface on a display of the user device, a list of performance metrics associated with the IoT application that are capable of being selected by the user. Here, processor 420 may control which performance metrics are available for selection by dynamically adjusting the list of performance metrics that can be selected for the IoT application based on the type of the IoT application from among a plurality of possible types. For example, if the IoT application is a classification based analytic, the processor 420 may provide at least one performance metric from among a receiver operating characteristic (ROC) curve, a confusion matrix, a lift chart, and the like. If the IoT application is a regression based application, the processor 420 may select at least one performance metric from among R squared, mean absolute error (MAE), mean squared error (MSE), mean square root error (RMSE), and the like. In some examples, the processor 420 may receive a new output of the IoT application deployed on the cloud platform, and calculate another performance of the IoT application based on the previously selected at least one performance metric, the newly received output of the IoT application, and the expected output of the IoT application.

Figure 6A:
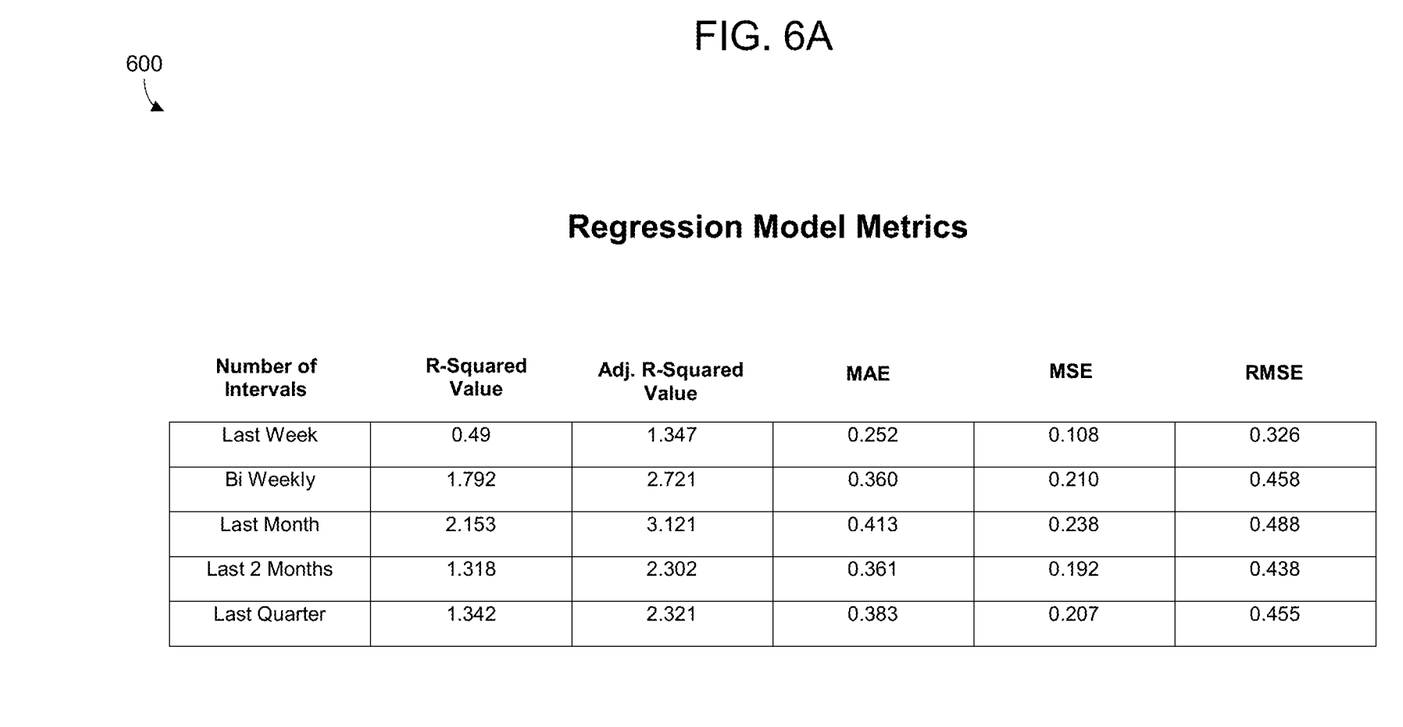
FIGS. 6A-6C are diagrams illustrating examples of performance metrics calculated based on an IoT application, in accordance with example embodiments.
Figure 6B:
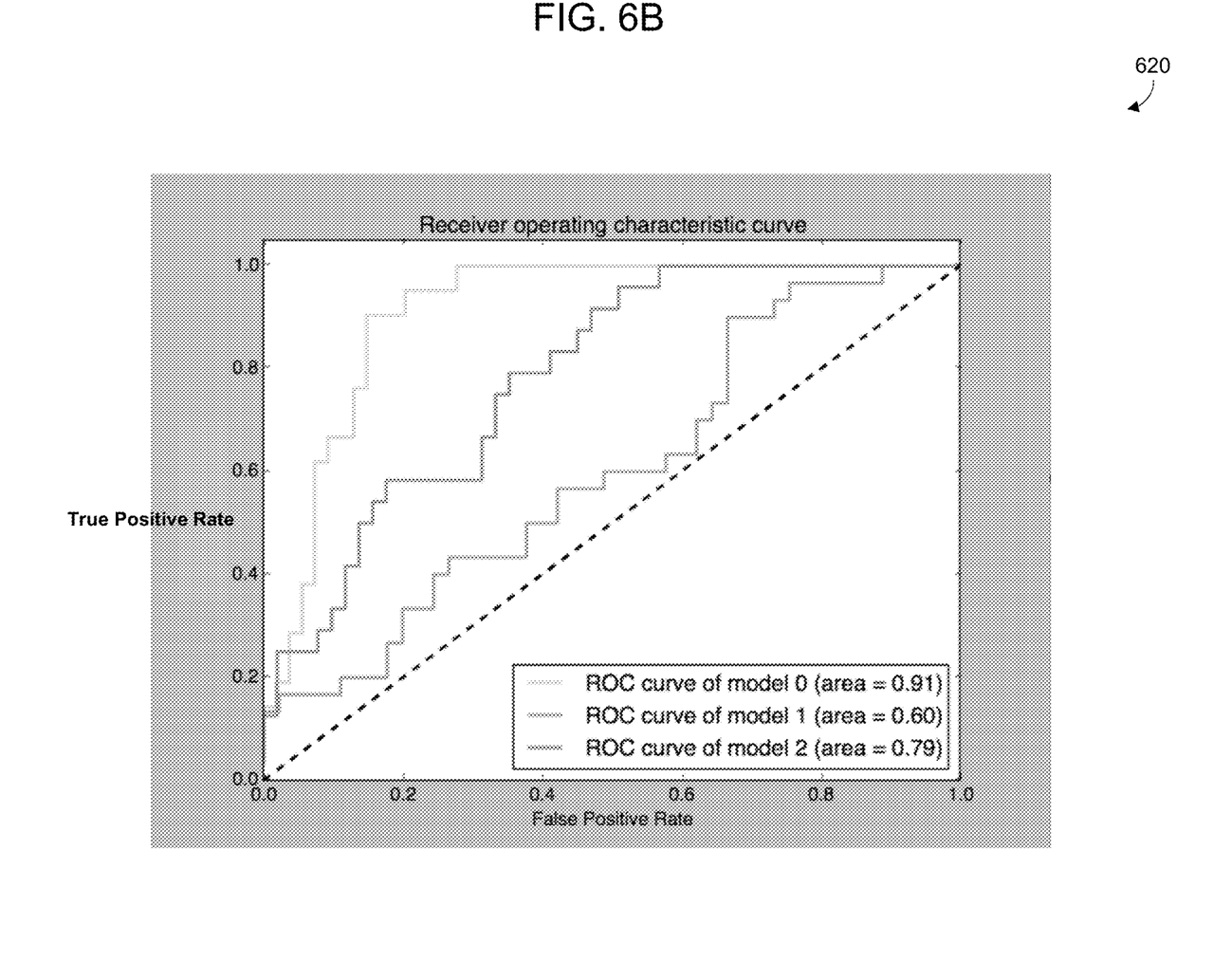
Figure 6C:
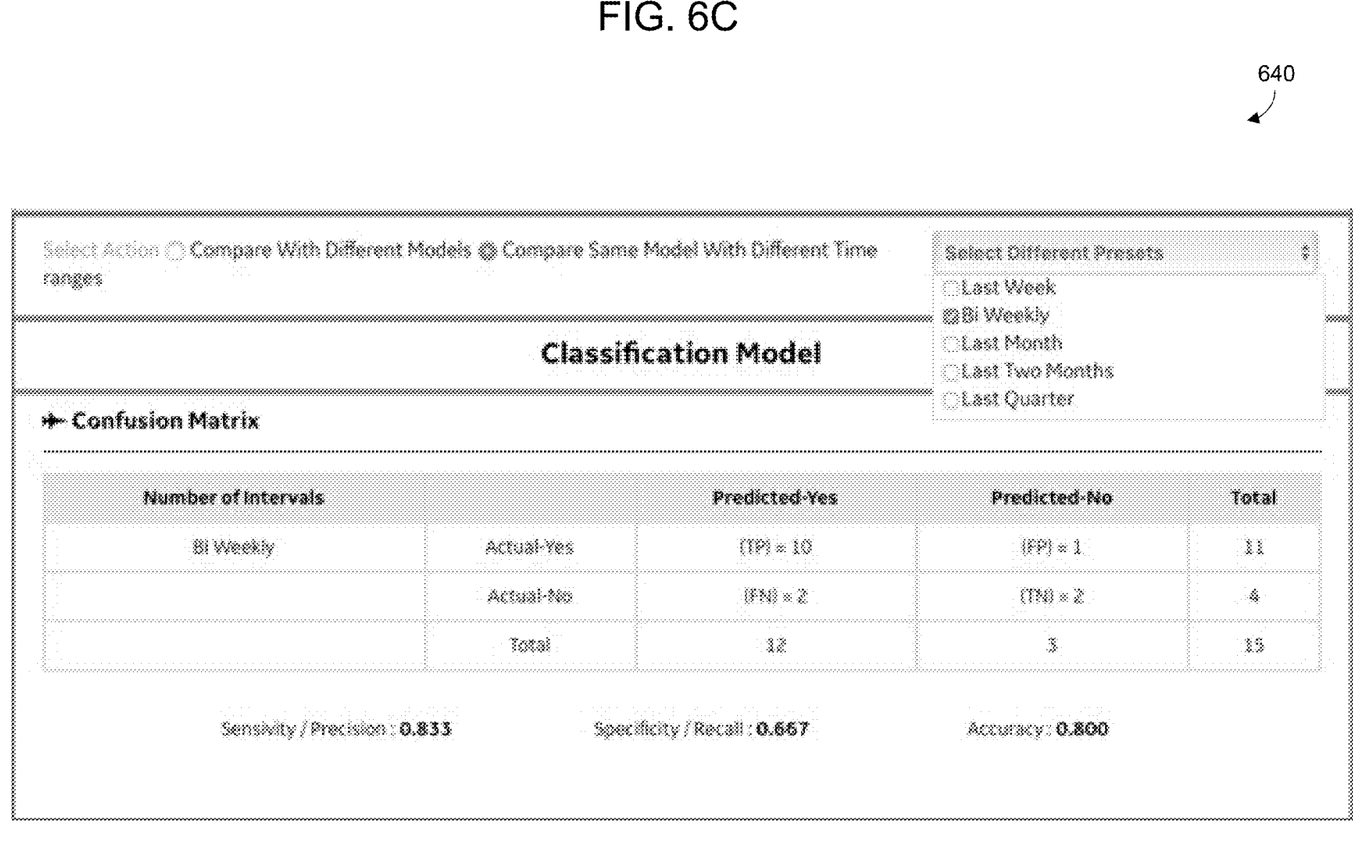

FIGS. 6A through 6C illustrate performance metrics performed with respect to an IoT application, in accordance with example embodiments. The performance metrics may receive the expected output and the actual output of the IoT application and calculate various metrics based thereon. The expected/actual output may include graphs, ratings, numerical values, descriptions, and/or the like. Accordingly, the example embodiments provide different types of performance metrics that can be performed based on the type of analytic application. For example, FIG. 6A illustrates an example of a regression model 600 including various calculations, FIG. 6B illustrates an example of an area under the curve 620 performance metric, and FIG. 6C illustrates an example of a confusion matrix 640 performance metric. Although not shown in the examples herein, it should be appreciated that the performance metrics are not limited to the examples shown in FIGS. 6A-6C.

Referring to FIG. 6A, the regression model includes a table 600 that includes a plurality of performance metrics including R-Squared, Adjusted R-Squared, Mean Absolute Error (MAE), Mean Squared Error (MSE), and Root Mean Squared Error (RMSE). Each of the performance metrics are calculated based on various intervals (e.g., weekly, bi-weekly, monthly, quarterly, and the like). For example, the R-squared value may represent a coefficient indicating the proportion of variance in the dependent variable that is explained by the independent variables. In this example, the actual output may include a graph and the expected output may also include a graph.

The table 600 includes performance metrics that have been generated by the example embodiments and which indicate how close the actual output is to the expected output. For example, the R-squared value may be represented as 1−((Sum Of Squares Of Residuals)/(Total Sum Of Squares)). In this example, the value for R-squared ranges between 0 and 1, where the larger the larger value for R-squared indicates a better value for the regression model. Adjusted R-squared value represents a modified r-squared that only increases when R-squared increases (i.e., due to the inclusion of a new explanatory variable) that is more than would occur by chance. Mean absolute error is a measure of how accurate predictions are to the eventual outcomes. MAE represents a mean value of the absolute values of the error terms (difference between expected and actual). In addition, mean squared error is the mean of the squared error terms, and root mean squared error is the square root of the means squared error.

FIG. 6B illustrates an example of a receiver operating characteristic (ROC) curve and an area under the ROC curve (AUC), in graph 620. The ROC curve and the AUC are measures of how well binary classification models (also referred to as a classifier) performs on data. Examples of outputs of a classification model including generating two groups of outputs such as true/false, yes/no, group 1/group 2, and the like. The ROC curve is a plot that illustrates the performance of the binary classifier system as a discrimination threshold thereof is varied. In this example, the y-axis is a true positive rate and the x-axis is a false positive rate. For example, if every patient that was tested for a particular illness was labeled as positive, but some of the patients did not have the particular illness, there would be both true positives as well as false positives. A strong classifier will have a good tradeoff between false positives and true positives (e.g., the more true positives at the same level of false positives the better). In this example, the higher above the diagonal line the ROC curve is, the stronger the binary classifier is. The diagonal line represents a classifier that performs random guessing. In this example, the higher the actual ROC curve is above the diagonal line the stronger the classifier is. Also, the shaded region represents the area under ROC curve. Here, the larger the shaded region the better the classifier is.

FIG. 6C illustrates a confusion matrix 640 which is also known as an error matrix. A confusion matrix is a table that is often used to describe the performance of a classification model on a set of test data for which the true values are known. Each column of the matrix represents the instances in a predicted/expected class while each row represents the instances in an actual class. Here, the binary classification is yes and no. For example, predicted-yes/actual-yes: number of true positives, predicted-no/actual-yes: false negatives, predicted-yes/actual-no: false positives, and predicted-no/actual-no: true negatives.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/ machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing device comprising:
   a storage configured to store an expected predictive output of an Internet of Things (IoT) analytic application deployed on a cloud platform;
   a processor configured to receive an actual predictive output of the IoT analytic application running on a host platform, select at least one performance metric, from among a plurality of performance metrics, based on a type of the IoT analytic application, determine a predictive accuracy performance value that identifies how accurate the IoT analytic application is at making predictions in association with an industrial asset based on the selected at least one performance metric, the actual predictive output of the IoT analytic application, and the expected predictive output of the IoT analytic application, and determine that a predictive performance of the IoT analytic application running on the host platform has deteriorated based on the determined predictive accuracy performance value,
   wherein the processor is configured to dynamically provide the at least one performance metric based on the type of the IoT application including:
      at least one of a receiver operating characteristic (ROC) curve, a confusion matrix, and a lift chart, in response to the type of the IoT analytic application being a classification based IoT analytic,
      at least one of R squared, mean absolute error (MAE), mean squared error (MSE), and mean square root error (RMSE), in response to the type of the IoT analytic application being a regression based IoT analytic, or
      at least one of MAE, MSE, a plot of MAE against a plot of forecast time horizon, and a confidence interval plot, in response to the type of the IoT analytic application being a time-series based IoT analytic, and
   the processor is further configured to transmit an alert to a user device indicating that the predictive performance of the IoT analytic application running on the host platform has deteriorated.

2. The computing device of claim 1, wherein the predictive accuracy performance value identifies how successful the IoT analytic application is at making predications in association with an industrial asset based on a comparison of the received actual predictive output of the IoT analytic application and the expected predictive output of the IoT analytic application using the selected at least one performance metric.

3. The computing device of claim 1, wherein the processor is further configured to display, via a user interface, a list of performance metrics associated with the IoT analytic application that are capable of being selected by a user.

4. The computing device of claim 1, wherein the processor is configured to display the list of performance metrics including at least one of the ROC curve, the confusion matrix, and the lift chart, in response to the type of the IoT analytic application being the classification based IoT analytic.

5. The computing device of claim 1, wherein the processor is configured to display the list of performance metrics including at least one of the R squared, the MAE, the MSE, and the RMSE, in response to the type of the IoT analytic application being the regression based IoT analytic.

6. The computing device of claim 1, wherein the processor is configured to display the list of performance metrics including at least one of the MAE, the MSE, the plot of MAE against the plot of forecast time horizon, and the confidence interval plot, in response to the type of the IoT analytic application being the time-series based IoT analytic.

7. The computing device of claim 1, wherein the processor is further configured to receive a new predictive output of the IoT analytic application deployed on the cloud platform, and determine another predictive accuracy performance value of the IoT analytic application based on the previously selected at least one performance metric, the newly received predictive output of the IoT analytic application, and the expected predictive output of the IoT analytic application.

8. A method comprising:
   receiving an actual predictive output of an IoT analytic application deployed on a host platform;
   selecting at least one performance metric, from among a plurality of performance metrics, based on a type of the IoT analytic application;
   determine a predictive accuracy performance value that identifies how accurate the IoT analytic application is at making predictions in association with an industrial asset based on the selected at least one performance metric, the received actual predictive output of the IoT analytic application on the host platform, and an expected predictive output of the IoT analytic application;
   determining that a predictive performance of the IoT analytic application on the host platform has deteriorated based on the determined predictive accuracy performance value;
   dynamically providing the at least one performance metric based on the type of the IoT application including:
      at least one of a receiver operating characteristic (ROC) curve, a confusion matrix, and a lift chart, in response to the type of the IoT analytic application being a classification based IoT analytic,
      at least one of R squared, mean absolute error (MAE), mean squared error (MSE), and mean square root error (RMSE), in response to the type of the IoT analytic application being a regression based IoT analytic, or
      at least one of MAE, MSE, a plot of MAE against a plot of forecast time horizon, and a confidence interval plot, in response to the type of the IoT analytic application being a time-series based IoT analytic, and in response, transmitting an alert to a user device indicating that the predictive performance of the IoT analytic application deployed on the host platform has deteriorated.

9. The method of claim 8, wherein the predictive accuracy performance value identifies how successful the IoT analytic application is at making predictions in association with an industrial asset based on a comparison of the received predictive output of the IoT analytic application and the expected predictive output of the IoT analytic application using the selected at least one performance metric.

10. The method of claim 8, further comprising displaying, via a user interface, a list of performance metrics associated with the IoT analytic application that are capable of being selected by a user.

11. The method of 10, wherein the displayed list of performance metrics comprises at least one of the ROC curve, the confusion matrix, and the lift chart, in response to the type of the IoT analytic application being the classification based IoT analytic.

12. The method of claim 10, wherein the displayed list comprises of performance metrics comprises at least one of the R squared, the MAE, the MSE, and the RMSE, in response to the type of the IoT analytic application being the regression based IoT analytic.

13. The method of claim 10, wherein the displayed list of performance metrics comprises at least one of MAE, MSE, a plot of MAE against a plot of forecast time horizon, and a confidence interval plot, in response to the type of the IoT analytic application being a time-series based IoT analytic.

14. The method of claim 8, further comprising receiving a new predictive output of the IoT analytic application deployed on the cloud platform, and determining another predictive performance value of the IoT analytic application based on the previously selected at least one performance metric, the newly received predictive output of the IoT analytic application, and the expected predictive output of the IoT analytic application.

15. A non-transitory computer readable medium having stored therein instructions that when executed cause a computer to perform a method for monitoring a health of an Internet of Things (IoT) application, the method comprising:

receiving an actual predictive output of an IoT analytic application deployed on a host platform;

selecting at least one performance metric, from among a plurality of performance metrics, based on a type of the IoT analytic application;

determining a predictive accuracy performance value that identifies how accurate the IoT analytic application is at making predictions in association with an industrial asset based on the selected at least one performance metric, the received actual predictive output of the IoT analytic application on the host platform, and an expected predictive output of the IoT analytic application;

determining that a predictive performance of the IoT analytic application on the host platform has deteriorated based on the determined predictive accuracy performance value;

dynamically providing the at least one performance metric based on the type of the IoT application including:

at least one of a receiver operating characteristic (ROC) curve, a confusion matrix, and a lift chart, in response to the type of the IoT analytic application being a classification based IoT analytic, at least one of R squared, mean absolute error (MAE), mean squared error (MSE), and mean square root error (RMSE), in response to the type of the IoT analytic application being a regression based IoT analytic, or at least one of MAE, MSE, a plot of MAE against a plot of forecast time horizon, and a confidence interval plot, in response to the type of the IoT analytic application being a time-series based IoT analytic, and in response, transmitting an alert to a user device indicating that the predictive performance of the IoT analytic application deployed on the host platform has deteriorated.

16. The non-transitory computer readable medium of claim 15, wherein the predictive accuracy performance value identifies how successful the IoT analytic application is at making predictions in association with an industrial asset based on a comparison of the received actual predictive output of the IoT analytic application and the expected predictive output of the IoT analytic application using the selected performance metrics.

17. The non-transitory computer readable medium of claim 15, wherein the method further comprises displaying, via a user interface, a list of performance metrics associated with the IoT analytic application that are capable of being selected by a user.

* * * * *